United States Patent
Badouin et al.

(10) Patent No.: US 11,385,638 B2
(45) Date of Patent: Jul. 12, 2022

(54) METHOD FOR OPERATING A SAFETY SYSTEM FOR A MOTOR VEHICLE AND SAFETY SYSTEM

(71) Applicant: AUDI AG, Ingolstadt (DE)

(72) Inventors: David Alexander Badouin, Ingolstadt (DE); Kai Uwe Kreher, Ingolstadt (DE)

(73) Assignee: Audi AG, Ingolstadt (DE)

( * ) Notice: Subject to any disclaimer, the term of this patent is extended or adjusted under 35 U.S.C. 154(b) by 353 days.

(21) Appl. No.: 16/475,244

(22) PCT Filed: Dec. 11, 2017

(86) PCT No.: PCT/EP2017/082220
§ 371 (c)(1),
(2) Date: Jul. 1, 2019

(87) PCT Pub. No.: WO2018/130354
PCT Pub. Date: Jul. 19, 2018

(65) Prior Publication Data
US 2019/0339698 A1    Nov. 7, 2019

(30) Foreign Application Priority Data

Jan. 12, 2017    (DE) ..................... 10 2017 200 432.0

(51) Int. Cl.
*G05D 1/00* (2006.01)
*B60R 25/24* (2013.01)
(Continued)

(52) U.S. Cl.
CPC .......... *G05D 1/0061* (2013.01); *B60R 25/24* (2013.01); *G05D 1/0276* (2013.01); *G07C 9/28* (2020.01);
(Continued)

(58) Field of Classification Search
CPC .. G05D 1/0061; G05D 1/0276; G05D 1/0231; G05D 1/0255; G05D 1/0257;
(Continued)

(56) References Cited

U.S. PATENT DOCUMENTS 6,360,668 B1    3/2002  Rauch
8,299,941 B2   10/2012  Faber
(Continued)

FOREIGN PATENT DOCUMENTS

CN    1289295 A     3/2001
CN    1540286 A    10/2004
(Continued)

OTHER PUBLICATIONS

International Search Report and Written Opinion of the International Searching Authority directed to related International Patent Application No. PCT/EP2017/082220, dated Mar. 13, 2018, with attached English-language translation; 19 pages.
(Continued)

*Primary Examiner* — Jess Whittington
*Assistant Examiner* — Brian E Yang
(74) *Attorney, Agent, or Firm* — Sterne, Kessler, Goldstein & Fox P.L.L.C.

(57) ABSTRACT

The disclosure relates to a procedure for operating a safety system for a motor vehicle for driving beyond a system boundary. The motor vehicle moves autonomously within a predetermined area, defined by the system boundary, in an autonomous driving mode from a delivery point to a predetermined position and back to the delivery point. To drive beyond the system boundary, a mechanical blocking device of the safety system is first detected by a detection device of the motor vehicle, the mechanical blocking device forming part of the system boundary. Subsequently, a current driving mode of the motor vehicle is detected. Next, a driving mode
(Continued)

message is output by a communication device of the motor vehicle for opening the mechanical blocking device. Finally, the mechanical blocking device is opened when the motor vehicle is in a non-autonomous driving mode according to the driving mode message.

14 Claims, 1 Drawing Sheet

(51) Int. Cl.
   *G05D 1/02* (2020.01)
   *G07C 9/28* (2020.01)

(52) U.S. Cl.
   CPC ......... *G05D 1/0231* (2013.01); *G05D 1/0255* (2013.01); *G05D 1/0257* (2013.01); *G05D 2201/0213* (2013.01)

(58) Field of Classification Search
   CPC .. G05D 2201/0213; G07C 9/28; B60R 25/24; B62D 15/0285; G08G 1/146
   See application file for complete search history.

(56) References Cited

U.S. PATENT DOCUMENTS

| | | | |
|---|---|---|---|
| 9,188,985 | B1 | 11/2015 | Hobbs et al. |
| 9,317,033 | B2 | 4/2016 | Ibanez-Guzman et al. |
| 9,478,135 | B2 | 10/2016 | Fujishiro |
| 9,721,468 | B2 | 8/2017 | Giesler et al. |
| 9,836,051 | B2 | 12/2017 | Ishikawa et al. |
| 10,401,190 | B2 | 9/2019 | Zhang |
| 2001/0020429 | A1 | 9/2001 | Serrano |
| 2014/0358353 | A1 | 12/2014 | Ibanez-Guzman et al. |
| 2016/0240080 | A1* | 8/2016 | Nordbruch ............ G08G 1/147 |
| 2016/0288801 | A1 | 10/2016 | Chen |
| 2016/0355192 | A1 | 12/2016 | James et al. |
| 2017/0073912 | A1* | 3/2017 | Marabyan ............ G06Q 20/045 |
| 2017/0309177 | A1 | 10/2017 | Hoffmann et al. |
| 2018/0024554 | A1* | 1/2018 | Brady ................ G06Q 10/0833 701/23 |
| 2018/0251994 | A1* | 9/2018 | Nordbruch ............. G08G 1/149 |

FOREIGN PATENT DOCUMENTS

| | | |
|---|---|---|
| CN | 101263038 A | 9/2008 |
| CN | 101799977 A | 8/2010 |
| CN | 102182128 A | 9/2011 |
| CN | 202058304 U | 11/2011 |
| CN | 102966253 A | 3/2013 |
| CN | 103400420 A | 11/2013 |
| CN | 103477378 A | 12/2013 |
| CN | 103538493 A | 1/2014 |
| CN | 103693038 A | 4/2014 |
| CN | 103985173 A | 8/2014 |
| CN | 104054034 A | 9/2014 |
| CN | 104260722 A | 1/2015 |
| CN | 104442811 A | 3/2015 |
| CN | 104569998 A | 4/2015 |
| CN | 105679069 A | 6/2015 |
| CN | 105629967 A | 6/2016 |
| CN | 105793910 A | 7/2016 |
| CN | 105869098 A | 8/2016 |
| CN | 105946595 A | 9/2016 |
| CN | 105957377 A | 9/2016 |
| DE | 102009029720 A1 | 12/2010 |
| DE | 102010005327 A1 | 7/2011 |
| DE | 102013008605 A1 | 11/2014 |
| DE | 102014221771 A1 | 4/2016 |
| DE | 102015202482 A1 | 8/2016 |
| DE | 102016207139 A1 | 11/2016 |
| DE | 102016100730 A1 | 7/2017 |
| WO | WO-0046068 A1 | 8/2000 |

OTHER PUBLICATIONS

International Preliminary Report on Patentability directed to related International Patent Application No. PCT/EP2017/082220, dated Jul. 16, 2019, with attached English-language translation; 15 pages.

* cited by examiner

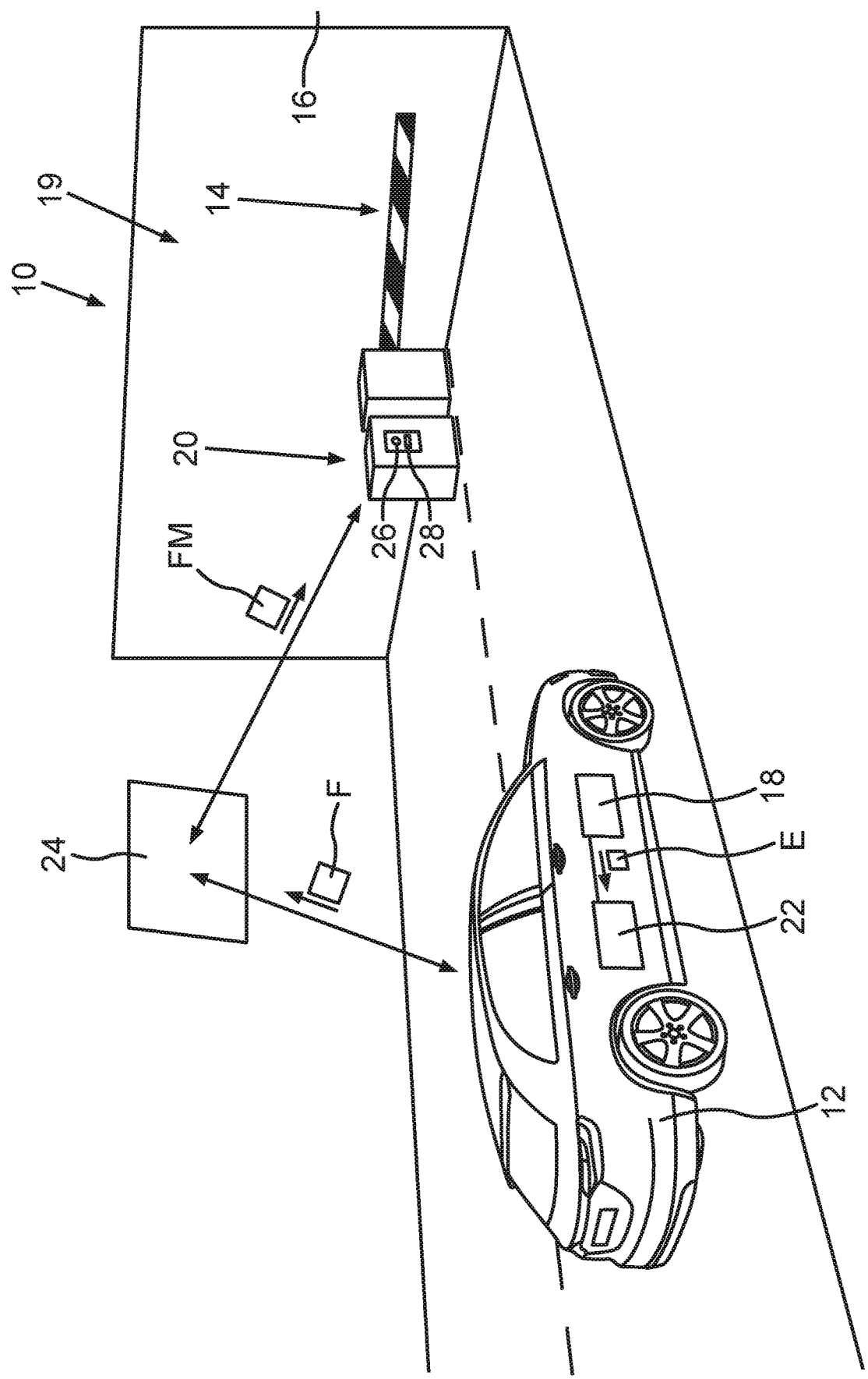

METHOD FOR OPERATING A SAFETY SYSTEM FOR A MOTOR VEHICLE AND SAFETY SYSTEM

TECHNICAL FIELD

The disclosure relates to a procedure for operating a safety system for a motor vehicle for driving beyond a system boundary. The disclosure also relates to a safety system for a motor vehicle and to a procedure for operating a server device of a safety system.

BACKGROUND

The use of driverless or autonomous driving functions will be limited in the early development phase of autonomously or driverlessly operated vehicles especially to certain environments, such as car parks, in which the motor vehicle parks automatically or driverlessly. The limitation to certain environments results from the fact that the safety of autonomously or driverlessly operated vehicles is only guaranteed in combination with certain basic conditions. If the autonomously or driverlessly operated motor vehicle entered the public road, it would present a hazard to road traffic outside the specific environment, such as the parking garage.

In order for the motor vehicle to move safely if operated autonomously, different approaches are known from prior art.

For example, DE 10 2013 008 605 A1 describes a procedure for operating a navigation system for a motor vehicle having an autopilot. In this case, the autopilot is designed to automatically perform a longitudinal and transverse guidance of the motor vehicle in the activated state during a piloted ride without the intervention of a driver. In the procedure, the navigation system determines a route to a destination of the driver on the basis of navigation data. Based on traffic data and based on a predetermined activation condition for the autopilot, it is determined on which roads the activation of the autopilot is anticipated to be possible.

U.S. Pat. No. 9,188,985 B1 describes a procedure for generating route options for an autonomous vehicle. The route options are based on navigation conditions, such as a total travel time, a driving distance or a fuel consumption. The route options may also include information about road sections on which the motor vehicle can be operated autonomously, semi-autonomously or only by a driver.

Such procedures provide suggestions or hints indicating when and where during a drive of the motor vehicle it may be safe for a driver to let the motor vehicle be operated by an autopilot. However, as soon as the driver decides to switch to the piloted driving mode, the piloted driving mode remains switched on. If there is a danger situation while driving, it is not ensured that the driving mode of the motor vehicle deactivates the piloted driving mode, i.e. the autonomous driving mode, so that the driver can regain control of his motor vehicle. As a result, the motor vehicle presents a danger to road traffic and road users when operated autonomously.

DE 10 2014 221 771 A1 discloses a procedure for operating a parking space. In the procedure, a route to a target position within the parking lot for autonomous driving of a vehicle in the parking lot to the target position is determined. Subsequently, at least a portion of the route is blocked for other vehicles before the vehicle passes through the section, so that the vehicle can drive autonomously through the section of the route which is blocked for other vehicles. The disadvantage of such a procedure is that the blocking of parts of the route prevents other motor vehicles or road users from moving freely. In addition, the effort required for coordinating the blocking of appropriate parts of the road, depending on when and where the vehicle is to be parked autonomously, is considerable.

The object of the present disclosure is therefore to provide a procedure for operating a safety system for a motor vehicle which is particularly easy to operate and, if the motor vehicle is in an autonomous driving mode, to ensure in good time that this neither hinders nor endangers other road users.

This object is achieved by a procedure for operating a safety system for a motor vehicle, by a procedure for operating a server device and by an associated safety system having the features of the independent patent claims. Advantageous embodiments with expedient and non-trivial developments of the disclosure are specified in the dependent claims.

BRIEF DESCRIPTION OF THE DRAWINGS

FIG. 1 illustrates a schematic representation of a safety system for a motor vehicle, according to some embodiments of the present disclosure.

DETAILED DESCRIPTION

In the procedure for operating a safety system for a motor vehicle to drive beyond a system boundary, the motor vehicle autonomously moves from a delivery location to a predetermined position and then back from the predetermined position to the delivery point within a predetermined area defined by the system boundary. With autonomous driving mode, it is preferably meant here that the motor vehicle moves independently, i.e. fully automatically. In the autonomous driving mode it can be factored in that there are no persons at all in the motor vehicle or that there is no active driver or only passengers in the motor vehicle. What is meant by "system boundary" within the meaning of the present disclosure is preferably a geographical limit, which limits the predetermined territory or a predetermined area. Accordingly, the "predetermined territory" preferably means a geographical area. For example, the predetermined territory may be a parking garage or a parking lot. The entrances and exits of the parking garage or the parking lot, for example, form or represent the system boundary.

To drive beyond the system boundary, a mechanical blocking device of the safety system is firstly charted by means of a detection device of the motor vehicle. The mechanical blocking device forms part of the system boundary. If the predetermined area is, for example, the parking garage, then the mechanical blocking device can be designed, for example, as a barrier or gate of the parking garage or parking lot as part of the entry or exit of the parking garage or the parking lot. The mechanical blocking device can therefore include a barrier or a gate. The detection device of the motor vehicle may include, for example, a laser, a camera, a radar, an ultrasound sensor, or a Lidar for detecting the mechanical blocking device. The barrier of the parking garage or parking space can preferably be sensed or recognized by the motor vehicle, that is to say the detection device of the motor vehicle.

In a further procedure step, in particular after the detection of the mechanical blocking device, a current driving mode of the motor vehicle is detected. In the sense of the disclosure, "driving mode" is preferably an autonomous or non-autonomous driving mode of the motor vehicle. The "non-autonomous driving mode" is preferably meant that the movement of the motor vehicle is operated by a driver of the motor vehicle.

Subsequently, a driving mode message is issued by a communication device of the motor vehicle for opening the mechanical blocking device. Finally, in a further procedure step, the mechanical blocking device is opened when, according to the driving mode message, the motor vehicle is in a non-autonomous driving mode. The driving mode message preferably includes information about the current driving mode of the motor vehicle. Preferably, the mechanical blocking device is opened to enable the motor vehicle to drive beyond the system boundary when a non-autonomous driving mode of the motor vehicle is detected. The mechanical blocking device is preferably not opened i.e. remains closed, when an autonomous driving mode of the motor vehicle is detected.

In the autonomous driving mode of the motor vehicle, the mechanical blocking device in particular prevents the motor vehicle from continuing to travel beyond the system boundary. This can ensure that the motor vehicle does not enter public traffic when it is in the autonomous driving mode. As a result, it can also be ensured in a particularly simple and reliable manner that the motor vehicle in autonomous driving mode does not present any danger to road traffic or road users.

One embodiment provides that during or after detecting the mechanical blocking device, the motor vehicle is brought to a standstill. As soon as the mechanical blocking device is detected by the detection device of the motor vehicle, the motor vehicle can be decelerated and brought to a standstill. For this purpose, the detection device can transmit or output a stop signal to a control device of the motor vehicle during or after the detection of the mechanical blocking device. Thereupon, the control device of the motor vehicle can be configured to bring the motor vehicle to a standstill. This results in the advantage that the motor vehicle, even if it is in autonomous driving mode, does not drive beyond the system boundary.

In some embodiments, before detecting the driving mode of the motor vehicle, the motor vehicle is transferred from the autonomous driving mode to the non-autonomous driving mode, wherein for detecting the driving mode when transferring the driving mode of the motor vehicle to the non-autonomous driving mode, the driving mode message from the motor vehicle is issued in particular to a server device. For example, a control device of the motor vehicle may be configured to detect the current driving mode of the motor vehicle. The control device can also be set up to communicate the current driving mode of the motor vehicle to the communication device or to transmit it to the communication device. The communication device of the motor vehicle may be configured to detect or receive the current driving mode of the motor vehicle and to transmit information about the current driving mode via the driving mode message to the server device of the safety system. The driving mode message includes, in particular, information about the driving mode of the motor vehicle. In this case, the communication device or the control device of the motor vehicle can be set up to output the driving mode message from the motor vehicle to the server device continuously or at predetermined time intervals. Preferably, upon receiving the driving mode message, the server device is configured to evaluate the driving mode message. Only when the server device detects that the motor vehicle is in a non-autonomous driving mode can the mechanical blocking device be operated by the server device. By detecting the driving mode of the motor vehicle, the safety system is regularly informed about the driving mode of the motor vehicle.

In some embodiments, before the mechanical blocking device is opened, a first safety condition and/or a second safety condition is checked by the safety system, wherein the mechanical blocking device is opened only when the first safety condition and/or the second safety condition are met. Preferably, the server device may be configured to check the first safety condition and/or the second safety condition. To open the mechanical blocking device, in particular after checking the first safety condition and/or the second safety condition, the mechanical blocking device can receive a release message or an enable signal. For example, the server device can output the release message, in particular to the mechanical blocking device. As soon as or when the mechanical blocking device receives the release message, the mechanical blocking device can be opened. The first safety condition and/or the second safety condition results in a multi-stage safety procedure for opening the mechanical blocking device.

In some embodiments, a ready-to-drive state of the motor vehicle is detected as the first safety condition. In this case, the ready-to-drive state can be signaled by the opening of at least one door of the motor vehicle, for example, the driver's door of the motor vehicle, the passenger door of the motor vehicle, a back door of the motor vehicle, or a tailgate of the motor vehicle. Preferably, the control device of the motor vehicle may be configured to detect the opening of the at least one door of the motor vehicle. Additionally or alternatively, the ready-to-drive state can be signaled by detecting an approach of a driver to the motor vehicle. An approach of the driver or a person to the motor vehicle can be detected, for example, by a proximity sensor or a camera at the motor vehicle, which is directed towards an environment of the motor vehicle. Additionally or alternatively, the ready-to-drive state can be signaled by detecting a radio key of the motor vehicle in an interior of the motor vehicle or by detecting the driver in the interior of the motor vehicle. For example, the driver or the radio key can be detected in the interior by a camera, which is arranged in particular on a roof liner of the motor vehicle. As soon as the opening of at least one door, an approach to the motor vehicle, the driver in the interior of the motor vehicle, or the radio key in the interior of the motor vehicle is detected, a signal can be output to the control device of the motor vehicle, which then transmits the ready-to-drive state to the server device.

In some embodiments, when the first safety condition is fulfilled, the motor vehicle is transferred from the autonomous driving mode to the non-autonomous driving mode. In other words, the motor vehicle can remain in the autonomous driving mode until it is detected by the safety system, in particular by the server device, that the first safety condition has been met. The first safety condition is fulfilled, for example, if the opening of the at least one door of the motor vehicle is detected as the ready-to-drive state.

An operating action of a user, in particular of a user of the motor vehicle, is preferably detected as the second safety condition at the mechanical blocking device. The operating action can be signaled by pressing a button at the mechanical blocking device. For example, the user can press a push button at the mechanical blocking device. Additionally or alternatively, the operating action can be signaled by introducing a release element in the mechanical blocking device. Additionally or alternatively, the operating action can be signaled by entering a code, in particular via an interface in the motor vehicle, such as via an HMI (Human Machine Interface). If, for example, the mechanical blocking device is a barrier of a parking garage, the driver can supply a parking ticket as a release element of the mechanical blocking device, in particular via an interface of the mechanical blocking device.

Due to the safety conditions, for example, first safety condition and/or second safety condition, the safety system can be operated particularly reliably.

The disclosure also includes a procedure for operating a server device of a safety system for opening a mechanical blocking device. First, a driving mode message or a driving mode signal is received by the server device, wherein the driving mode message reports a current driving mode of the motor vehicle. In other words, the driving information message informs the server device about the current driving mode of the motor vehicle. Subsequently, the driving mode message is evaluated by the server device. Finally, a release message or a release signal for opening the mechanical blocking device is issued by the server device if, after the evaluation of the drive operating message by the server device, a non-autonomous driving mode of the motor vehicle is detected. Preferably, the current driving mode of the motor vehicle is detected according to the driving mode message by the server device.

The disclosure also includes a safety system for a motor vehicle for driving beyond or passing a system boundary. In this case, the safety system has a detection device for detecting a mechanical blocking device of the safety system, wherein the blocking device forms part of the system boundary of a predetermined area, in particular of the safety system. The mechanical blocking device is preferably part of the safety system. Furthermore, the safety system includes a communication device, which is set up to output a driving mode message for opening the mechanical blocking device.

In some embodiments, the safety system includes a server device, which is set up to detect and evaluate a driving mode of the motor vehicle. The server device can also be configured to open the mechanical blocking device by activation when a non-autonomous driving mode of the motor vehicle is detected.

The advantages and preferred embodiments described for the procedures also apply to the safety system and vice versa.

The disclosure also includes further developments of the safety system, which have features such as those previously described in connection with the further developments of the procedures. For this reason, the corresponding further developments of the safety system according to the disclosure are not described here.

In the following an exemplary embodiment of the disclosure is described. FIG. 1 in a schematic representation shows the safety system 10 for a motor vehicle 12 for driving beyond or passing through a system boundary 14. The motor vehicle 12 is preferably a motor vehicle, in particular a passenger car.

The exemplary embodiment described below is a preferred embodiment of the disclosure. In this exemplary embodiment, the described components of the embodiment each constitute individual features of the disclosure that are to be considered independently of one another, which features contribute independently to the development of the disclosure and should thus be considered individually or in a combination other than that shown to be a constituent of the disclosure. In addition, features additional to those already described can also be added to the described embodiments.

The motor vehicle 12 is located, for example, in a parking garage 16. Furthermore, the motor vehicle 12 moves in the parking garage 16 autonomously or fully automatically. The motor vehicle 12 was parked by a driver or user of the motor vehicle 12 at a delivery point. At the delivery point, the driver exited the motor vehicle 12. The motor vehicle 12 was transferred by the driver to the delivery point in the autonomous driving mode. The motor vehicle 12 is adapted to then drive from the delivery point to a predetermined position. For example, the motor vehicle 12 was parked by the driver at the delivery point in the parking garage 16. In the autonomous driving mode, the motor vehicle 12 then automatically drives from the delivery point to a parking position and parks there. Subsequently, the motor vehicle may be configured to travel from the predetermined position back to the delivery point. The "delivery point" is preferably a position in which the driver of the motor vehicle 12 parked the motor vehicle 12 and exited the motor vehicle 12.

In order for the motor vehicle 12 to be able to move automatically from a delivery point to the predetermined position and back to the delivery point, the motor vehicle 12 communicates, for example via a radio link, with a local infrastructure, in particular the local infrastructure of the parking garage 16. The local infrastructure is set up to coordinate the functional sequences of the motor vehicle 12, that is to say, the movement of the motor vehicle 12 from the delivery point to the predetermined position and back again to the delivery point. In the exemplary embodiment it is shown that after leaving the predetermined position, the motor vehicle 12 returns to the delivery point.

As long as the motor vehicle 12 moves or travels from the predetermined position to the delivery point, the motor vehicle 12 is in an autonomous driving mode. The parking garage 16 forms a predetermined area, which is bordered by the system boundary 14. Within the predetermined area, i.e. within the parking garage 16, the motor vehicle 12 moves autonomously. However, in order to prevent the motor vehicle 12 from driving beyond the system boundary 14 in autonomous driving mode, the safety system 10 provides several safety levels. This is explained in more detail below.

As soon as the motor vehicle 12 approaches an exit of the parking garage 16 or the delivery point and wishes to leave the parking garage 16, a mechanical blocking device 20 is detected by means of a detection device 18 of the motor vehicle 12 or the safety system 10. Preferably, the detection device 18 is arranged at the motor vehicle 12 and directed to an environment of the motor vehicle 12. The detection device 18 of the motor vehicle 12 may include, for example, a camera and an ultrasonic sensor.

The mechanical blocking device 20 forms part of the system boundary 14. The mechanical blocking device 20 is a barrier of the parking garage 16. Alternatively, the mechanical blocking device 20 can also be, for example, a gate. As soon as the detection device 18 detects the mechanical blocking device 20, the detection device 18 transmits a detection signal E to a control device 22 of the motor vehicle 12 or the safety system 10. The control device 22 of the motor vehicle 12 can then be set up to decelerate the motor vehicle 12 after receiving the detection signal E and bring it to a standstill, in particular at a predetermined distance from the mechanical blocking device 20. At this stage, the motor vehicle 12 is still in an autonomous driving mode.

Subsequently, a driving mode of the motor vehicle 12 is detected by a server device 24 of the safety system 10. For this purpose, the control device 22 of the motor vehicle 12 may be configured to detect the current driving mode of the motor vehicle 12. After the detection of the current driving mode of the motor vehicle 12, the control device 22 can then be set up to notify the current driving mode of the motor vehicle 12 to a communication device (not shown in FIG. 1). Thereupon, the motor vehicle 12, in particular the communication device of the motor vehicle 12, can transmit a driving mode message F to the server device 24. Furthermore, the communication device of the motor vehicle 12 can be set up to output a driving mode message F, in particular to the server device 24, continuously, i.e. at regular time intervals. The driving mode message F contains information about the driving mode of the motor vehicle 12. The driving mode of the motor vehicle 12 can either be an autonomous driving mode, i.e. fully automatic driving mode, or a non-autonomous driving mode, that is to say driving mode of the motor vehicle 12 operated by the driver.

As soon as a non-autonomous driving mode of the motor vehicle 12 is detected by the server device 24, the mechanical blocking device 20 is opened so that the motor vehicle can drive beyond the system boundary 14. If the server device 24 detected an autonomous driving mode of the motor vehicle 12, according to the driving mode message F, the mechanical blocking device 20 would not be opened.

If a non-autonomous driving mode of the motor vehicle 12 is detected by the server device 24, the server device 24 transmits a release message FM to the mechanical blocking device 20. A control device (not shown in FIG. 1) of the mechanical blocking device 20 may be configured to receive the release message FM or the release signal. Thereupon, the control device of the mechanical blocking device 20 may be configured to control a mechanism for opening the mechanical blocking device 20, for example for raising the barrier of the parking garage 16.

For opening the barrier or the mechanical blocking device 20, further safety steps or additional safety conditions must possibly be fulfilled. Thus, provision may be made for a first safety condition and/or a second safety condition to be checked by the server device 24 before the mechanical blocking device 20 is opened. Only when the first safety condition and/or the second safety condition is fulfilled, is the mechanical blocking device 20 opened. In some embodiments, at least one of the two safety conditions for opening the mechanical blocking device 20 is to be fulfilled. In some embodiments, both safety conditions are to be fulfilled in succession, that is to say initially the first safety condition and then the second safety condition.

The first safety condition and/or the second safety condition results in a multi-stage safety procedure for opening the mechanical blocking device 20.

As the first safety condition, a ready-to-drive state of the motor vehicle is detected. In this case, the ready-to-drive state can be signaled by the opening of at least one door of the motor vehicle 12. For example, the driver's door of the motor vehicle 12, the passenger door of the motor vehicle, a back door of the motor vehicle, or a tailgate of the motor vehicle 12 can be opened. Additionally or alternatively, the ready-to-drive state may be signaled by detecting an approach of a driver to the motor vehicle 12. An approach of the driver or a person to the motor vehicle 12 can be detected, for example, by a further detection device, such as a proximity sensor or a camera at the motor vehicle 12, which is directed to an environment of the motor vehicle 12. Additionally or alternatively, the ready-to-drive state can be signaled by detecting a radio key of the motor vehicle 12 in an interior of the motor vehicle 12 or by detecting the driver in the interior of the motor vehicle. For example, the driver or the radio key can be detected in the interior by a camera, which is arranged in particular on a roof liner of the motor vehicle. As soon as the opening of at least one door, approach to the motor vehicle 12, the driver in the interior of the motor vehicle 12, or the remote control key in the interior of the motor vehicle 12 is detected, the motor vehicle 12 can be transferred from the autonomous to the non-autonomous driving mode. As soon as the opening of at least one door, an approach to the motor vehicle 12, the driver in the interior of the motor vehicle 12, or the remote control key in the interior of the motor vehicle 12 is detected, a ready-to-drive signal can be output to the control device 22 of the motor vehicle 12 which then transmits the ready-to-drive state to the server device 24. The server device 24 is then set up to output the release message FM to the mechanical blocking device 20.

As a second safety condition, an operating action of the user or driver at the mechanical blocking device 20 can be detected. In this case, the operating action can be signaled by an actuation of a button 26 at the mechanical blocking device 20. For example, the driver can press a push button at the mechanical blocking device 20. Additionally or alternatively, the operating action can be signaled by introducing a release element in the mechanical blocking device 20. If, for example, the mechanical blocking device is a barrier of a parking garage, the driver can supply a parking ticket as a release element of the mechanical blocking device, in particular via an interface 28 of the mechanical blocking device 20, to the mechanical blocking device 20. Additionally or alternatively, the operating action can be signaled by entering a code, in particular via an interface in the motor vehicle, such as via an HMI (Human Machine Interface). Upon detection of the operating action, an operating action signal of the server device 24 can be transmitted by the mechanical blocking device 20, in particular by the control device of the mechanical blocking device 20. The server device is then set up to output the release message FM mechanical blocking device 20.

The release message FM, the driving mode message F, or the detection signal can be transmitted or sent, for example, via a Bluetooth connection, a radio connection or a WLAN connection. The motor vehicle 12, the server device 24, and the control device 22 can communicate with the server device and the mechanical blocking device 20 via Bluetooth or via a wireless local network, i.e. wirelessly.

Overall, a safe deactivation of a driverless driving function for parking garages is described by the disclosure.

The use of driverless, i.e. autonomous, driving functions will be primarily limited to specific environments in the early phase. This is due to the fact that safety is only given in combination with certain basic conditions. If the motor vehicle were to independently enter into public traffic, it would be outside the actual system boundaries and thus a threat to public traffic. One way in which the motor vehicle is independently introduced into the traffic is that the localization of the motor vehicle is working incorrectly, so that the motor vehicle simply drives beyond the takeover zone, i.e. the delivery point, at which the motor vehicle should stop to be received by the driver.

In order to ensure that the motor vehicle does not enter independently on public roads, obstacles are detected during driverless driving by means of sensors of the motor vehicle, whereupon the motor vehicle brakes. Therefore, a barrier is to be installed which is sensed by the motor vehicle and according to which the software of the motor vehicle brakes. In addition, the driverless function is deactivated at the moment in which any door of the motor vehicle is opened. The opening of any door of the motor vehicle is reported to the server or the server device of the parking garage. Thus, the first of two safety conditions for opening the barrier or the mechanical blocking device is fulfilled. The second condition can be fulfilled only after the fulfillment of the first safety condition by performing a specific operation by a driver at the barrier. The predetermined operating action may be, for example, the pressing of a button, the insertion of a parking ticket, or the input of a code via HMI (Human Machine Interface). After fulfilling the second safety condition, the barrier opens because it can be ensured that the driver has regained control of the motor vehicle.

The invention claimed is:

1. A method for operating a safety system for moving a motor vehicle in a parking lot, comprising: moving the motor vehicle autonomously within a predetermined area defined by a system boundary in the parking lot in an autonomous driving mode from a delivery point to a predetermined position and then from the predetermined position back to the delivery point; detecting, by a detection device of the motor vehicle, a mechanical blocking device of the safety system, wherein the mechanical blocking device forms part of the system boundary; transferring the motor vehicle from the autonomous driving mode to a non-autonomous driving mode as a result that the mechanical blocking device is detected; detecting a current driving mode of the motor vehicle; outputting, by a communication device of the motor vehicle, a driving mode message for opening the mechanical blocking device; and opening, according to the driving mode message, the mechanical blocking device for the motor vehicle to exit the predetermined area when the motor vehicle is in the non-autonomous driving mode.

2. The method of claim 1, further comprising:
bringing the motor vehicle to a standstill upon or after detecting the mechanical blocking device.

3. The method of claim 1, further comprising:
checking, by the safety system, a first safety condition and a second safety condition before opening the mechanical blocking device, wherein the mechanical blocking device is opened only when the first safety condition or the second safety condition is met.

4. The method of claim 3, further comprising:
detecting a ready-to-drive state of the motor vehicle as the first safety condition, wherein the detecting of the ready-to-drive state comprises opening at least one door of the motor vehicle, detecting an approach of a driver to the motor vehicle, detecting a radio key of the motor vehicle in an interior of the motor vehicle, or detecting the driver in the interior of the motor vehicle.

5. The method of claim 3, further comprising:
detecting an operating action of a user at the mechanical blocking device as the second safety condition, wherein the operating action comprises actuating a button or introducing a release element in the mechanical blocking device.

6. The method of claim 1, further comprising:
receiving, by a server device of the safety system, a driving mode message, wherein the driving mode message reports the current driving mode of the motor vehicle;
evaluating, by the server device, the driving mode message; and
issuing, by the server device, a release message for opening the mechanical blocking device when the non-autonomous driving mode is detected.

7. A safety system for moving a motor vehicle in a parking lot, comprising:
a mechanical blocking device forming part of a system boundary of a predetermined area in the parking lot, wherein the motor vehicle is configured to move within the predetermined area in an autonomous driving mode from a delivery point to a predetermined position and then from the predetermined position back to the delivery point;
a detection device of the motor vehicle configured to detect the mechanical blocking device of the safety system;
a control device of the motor vehicle configured to detect a current driving mode of the motor vehicle; and
a communication device configured to output a driving mode message for opening the mechanical blocking device, wherein:
the safety system is configured to open, according to the driving mode message, the mechanical blocking device for the motor vehicle to exit the predetermined area when the motor vehicle is transferred from the autonomous driving mode to a non-autonomous driving mode.

8. The safety system of claim 7, wherein the mechanical blocking device comprises a barrier or a gate.

9. The safety system of claim 7, wherein the detection device comprises a sensor, an ultrasonic sensor, a radar system, a LIDAR system or a laser device.

10. The safety, system of claim 7, wherein the control device is further configured to bring the motor vehicle to a standstill upon or after the mechanical blocking device is detected.

11. The safety system of claim 7, further configured to check a first safety condition and a second safety condition before opening the mechanical blocking device, wherein the mechanical blocking device is opened only when the first safety condition or the second safety condition is met.

12. The safety system of claim 11, wherein the detection device is further configured to detect a ready-to-drive state of the motor vehicle as the first safety condition, wherein the ready-to-drive state comprises a status where at least one door of the motor vehicle is opened, an approach of a driver to the motor vehicle is detected, a radio key of the motor vehicle in an interior of the motor vehicle is detected, or the driver in the interior of the motor vehicle is detected.

13. The safety system of claim 11, further comprising:
a button or a release element, wherein the second safety condition is met when a user at the mechanical blocking device actuates the button or the release element.

14. The safety system of claim 7, further comprising:
a server device configured to:
receive and evaluate the driving mode message; and
issue a release message for opening the mechanical blocking device when the non-autonomous driving mode is detected.

\* \* \* \* \*